US005320402A

United States Patent [19]
Evers

[11] Patent Number: 5,320,402
[45] Date of Patent: Jun. 14, 1994

[54] CLOSURE WEB FOR A TRUCK VAN

[76] Inventor: Andé Evers, 1600 Huntingdon Trail Dr., Atlanta, Ga. 30350

[21] Appl. No.: 967,674

[22] Filed: Oct. 26, 1992

[51] Int. Cl.⁵ .................................................. B60J 5/06
[52] U.S. Cl. ................................. 296/183; 296/181; 220/1.5
[58] Field of Search ................. 296/183, 181, 138; 220/1.5, 9.1

[56] References Cited

U.S. PATENT DOCUMENTS

| | | | |
|---|---|---|---|
| 4,621,862 | 11/1986 | Kramer | 296/183 |
| 4,828,316 | 5/1989 | Bennett et al. | 296/183 |
| 4,952,009 | 8/1990 | Mountz et al. | 296/181 |
| 5,044,689 | 9/1991 | Evers | 296/183 |

Primary Examiner—Robert R. Song
Attorney, Agent, or Firm—Needle & Rosenberg

[57] ABSTRACT

Improvements in a truck van closure of the type having a flexible closure web with an opening therethrough and means for moving the web about the perimeter of the van between an inoperative position wherein access through the opening into the interior of the van is prevented and an operative position wherein access through the opening is allowed, the improvements comprising a means for tensioning the web in a vertical plane when the web is in its inoperative position, means for guiding the web along its path of travel between its operative and inoperative position and means for sealing the web against the entry of foreign materials into the van over the top of the web when the web is in its inoperative position.

4 Claims, 4 Drawing Sheets

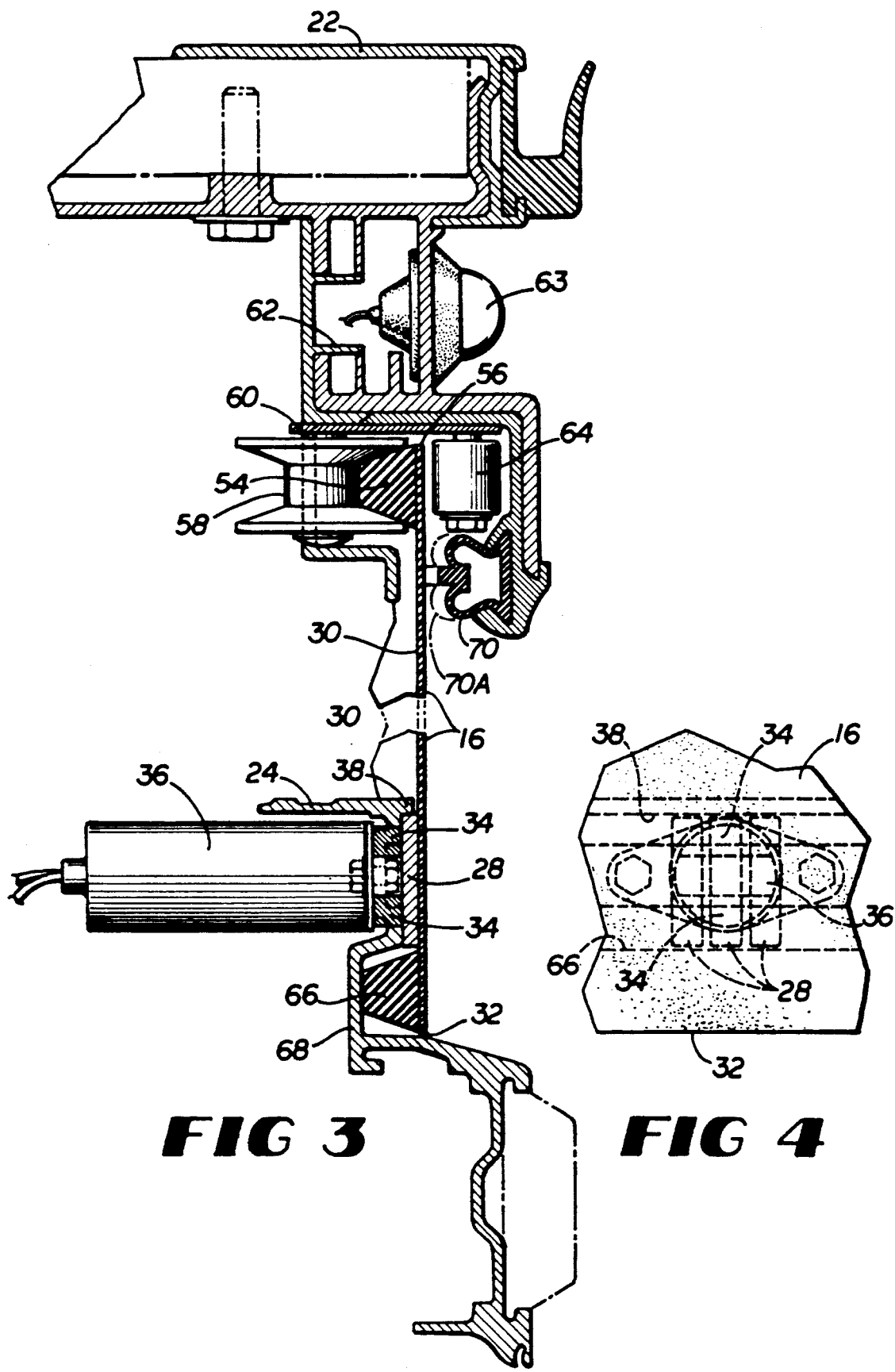

CLOSURE WEB FOR A TRUCK VAN

BACKGROUND OF THE INVENTION

This invention relates to an improved closure means for a truck van having a movable closure web with an opening therethrough that is selectively positionable to facilitate loading and unloading the truck. The web is movable about the perimeter of the van between an operative position allowing access into the interior of the van through the opening and a home or inoperative position wherein access through the opening is prevented. Such a closure means if disclosed in U.S. Pat. No. 5,044,689, issued Sep. 3, 1991.

A problem with the flexible closure web disclosed in that patent is that when the truck is in motion, particularly at an accelerated speed along the highway, the longitudinally extending sides of the web have a tendency to bow inwardly due to the passage of air thereacross. Thus, means for tensioning at least the bottom portion of the web are desirable when the web is in its inoperative position and the truck is moving.

Also, means are needed to help guide the upper portion of the web along its movement about the perimeter of the van. Further, it is preferable to provide a means for sealing the upper part of the web from dust and debris which might enter the van over the top of the web as the truck moves.

SUMMARY OF THE INVENTION

The above problems are solved by the present invention which includes a means for selectively tensioning the web adjacent its bottom when the web is in its operative position. The tensioning means includes a plurality of strips of rigid, ferrous material which are fixed about the inner surface of the web along its bottom and a plurality of magnets that are fixed on the van in a spaced relationship about the periphery thereof and which are in registry with the ferrous strips when the web is in its inoperative position. Means are provided to selectively demagnetize the magnets. When the web is in its inoperative position, the magnets are de-energized so that there is an attraction between the ferrous strips and the magnets, causing the bottom of the web to be tensioned in a vertical plane. The web, being held taut by the attractive force of the magnets, is prevented from bowing inwardly as the truck moves.

When it is desired to move the web to an operative position, the magnets are energized, thereby becoming de-magnetized. Since the web is, at that point, no longer secured by the magnets, it can be moved to the selected operative position.

Other embodiments of the tensioning means include a plurality of shaped members secured along the interior surface of the web adjacent its bottom which engage a complimentarily-shaped guide means that is fixed about the perimeter of the truck van.

The upper guide means of the present invention includes a hard-rubber seal secured along the interior surface of the web adjacent its top. The seal has a frusto-conical shape in cross-section. Spaced along the sides and ends of the van are a plurality of rotable guide pulleys in which the seal rides. The guide means further includes a plurality of rollers secured to the truck van adjacent the top of the exterior of the web, the roller being in registration with the seal with the web therebetween.

The sealing means comprises an inflatable/deflatable bladder that is longitudinally positioned beneath the rollers adjacent the exterior of the web. The bladder is inflated to engage the exterior surface of the web when the web is in its home position and is deflated when the web is moved in and out of its operative position. Bladders may also be vertically disposed along the corner posts on the van.

BRIEF DESCRIPTION OF THE FIGURES OF THE DRAWINGS

FIG. 3 is a vertical cross-section of the web of the present invention;

FIG. 4 is a front view of the exterior of the web adjacent its bottom showing the magnetic web tensioning means of the present invention;

DETAILED DESCRIPTION OF THE PREFERRED EMBODIMENT

Figure 1:
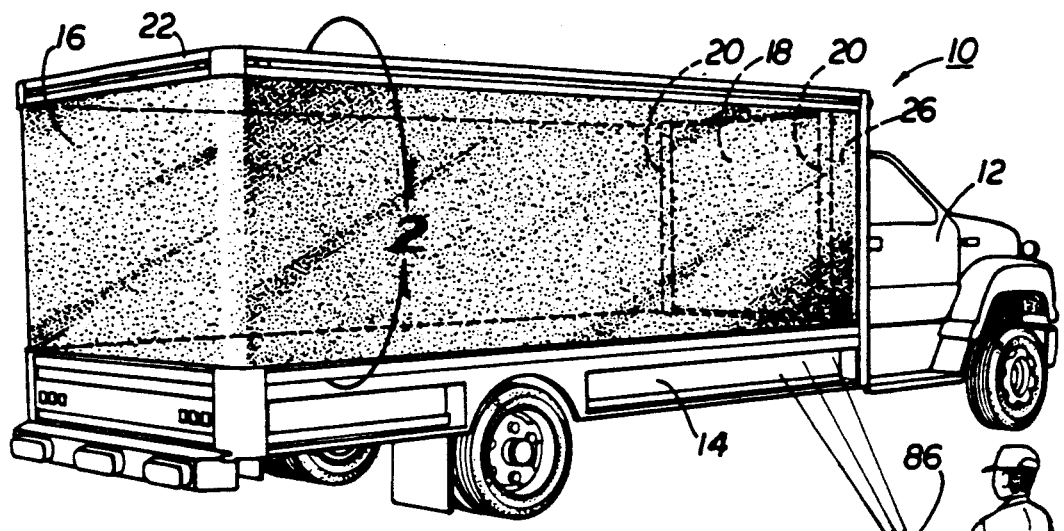
FIG. 1 is a perspective view of a truck and its associated van to which this invention is applicable.

Referring to FIG. 1, the numeral 10 designates the present invention which includes a truck 12 and an associated truck van 14. A closure structure for the van 14 is provided which includes an upright, endless, flexible movable web 16 having a rectangular-shaped opening 18 therethrough. Vertical reinforcements 20 are positioned along the spaced side edges of the opening 18. The web 16 is positioned between the van roof 22 and the floor bed 24. As described in the '689 patent, vertical posts 25 (FIG. 7) are provided at each corner of the floor bed about which the web 16 moves.

Operation of a motor 88 (FIG. 7) imparts movement (through associated components described below) to the web 16 to position the opening 18 at a desired, operative position on the left, right or rear of the van 14 to provide ingress and egress to the interior of the van 14, depending on the circumstances to facilitate loading and unloading thereof. For security purposes, the web 16 is returned to its home or inoperative position as shown in FIG. 1 with the opening 18 adjacent the front wall 26 of the truck 12.

Figure 2:
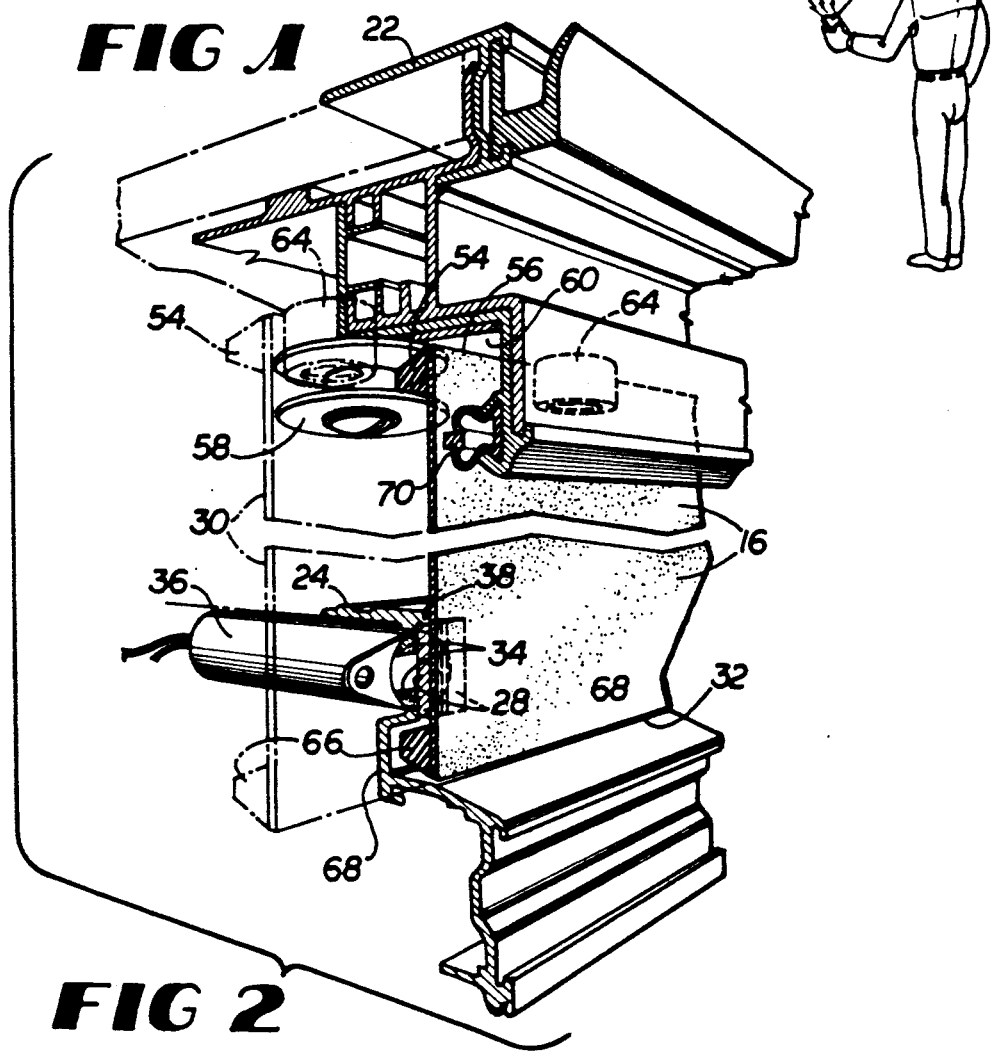
FIG. 2 is a fore-shortened view of the web of the present invention taken along inset 2 in FIG. 1.

As seen in FIGS. 2–4, tensioning means for the web 16 is provided by a plurality of ferrous strips 28 which are affixed in spaced, vertical orientation to the inner surface 30 of the web 16 adjacent bottom 32. FIG. 4 shows three such ferrous strips 28 but it is understood that any number of them is satisfactory. The ferrous strips 28 are spaced from each other to provide flexibility as the web 16 moves around the corner posts 25. A plurality of sets of ferrous strips 28 are spaced along the inner surface 30.

Secured beneath or into the floor bed 24 of the van 14 adjacent the inner surface 30 of the web 16 are a plurality of permanent magnets 34 that are in registry with a respective set of ferrous strips 28. The permanent magnets 34 are mounted on the sides and rear end of the van 14. The magnets 34 can be demagnetized by actuating electric coil 36 and can revert back to permanent magnets by deactivating the coil 36. A suitable magnet 34 and coil 36 can be obtained from Cookson Magnets, Inc., No. 214 Ramins Building, 272 Titus Avenue, Warrington, Pa. 18976-2483.

Positioned above the permanent magnets 34 is a flange 38 which outwardly extends from the floor 24. As seen in FIG. 3, when the magnets 34 and ferrous strips 28 are in abutting, attracting relationship, the ferrous strips 28 are received beneath the outwardly extending flange 38 to prevent the upward, vertical dislodgement of the ferrous strips 28 from the permanent magnets 34 when the truck 12 is moving.

Figure 5:
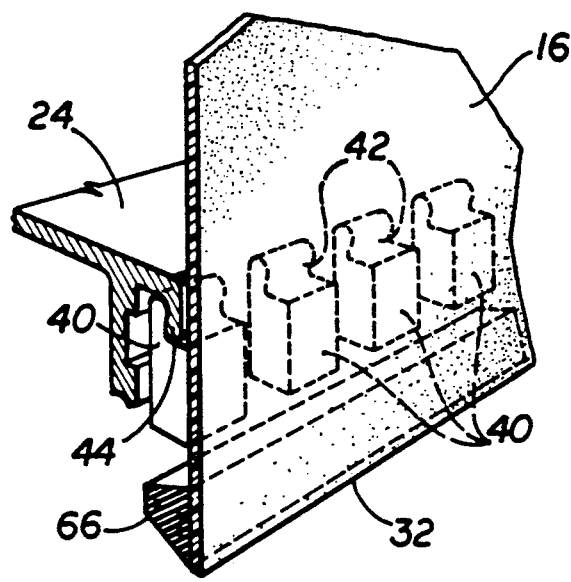
FIG. 5 is a perspective view of an alternate embodiment of the tensioning means.
Figure 6:
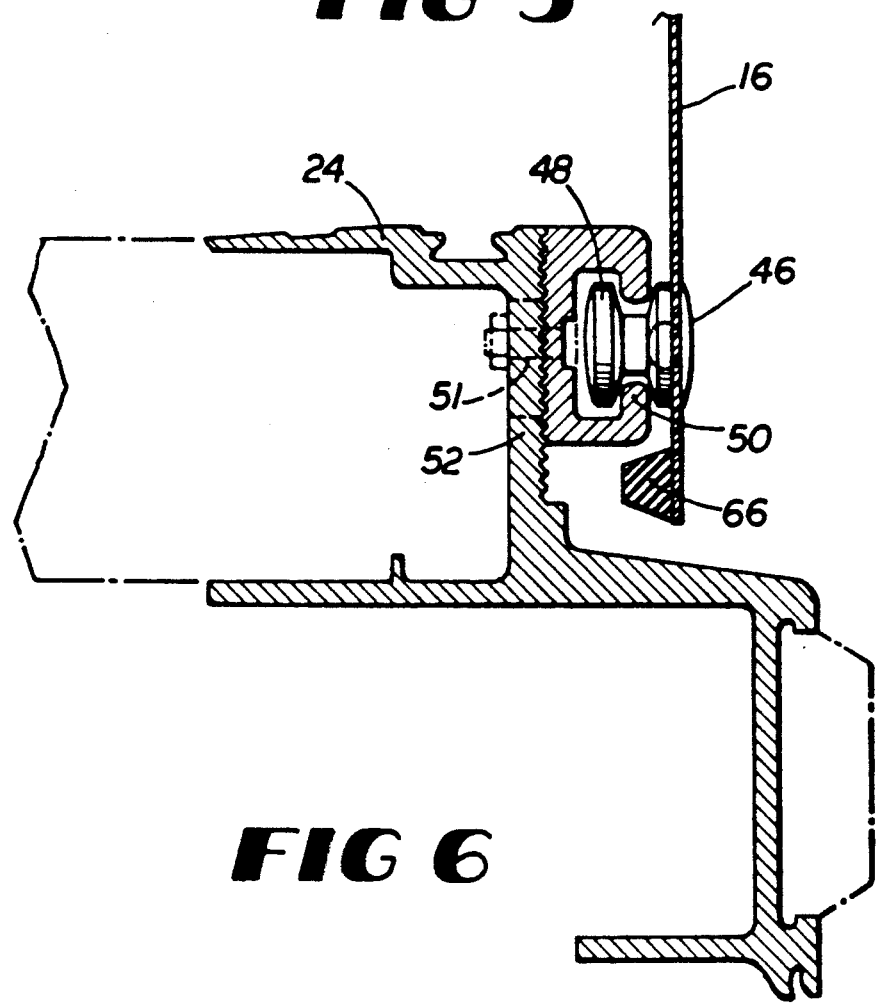
FIG. 6 is a cross-sectional view showing a further embodiment of the tensioning means of the present invention.

FIGS. 5 and 6 show other embodiments of the tensioning means. As seen in FIG. 5, a plurality of spaced-apart shaped elements 40 are affixed to the inner surface 30 of the web 16 adjacent its bottom 32. A notch 42 longitudinally extends through a portion of the top of each spaced-apart shaped element 40 that receives therein a complimentarily shaped depending flange 44 that extends from the floor bed 24.

In FIG. 6, the tensioning means includes a male member 46 that protrudes through the web 16 into mushroom-shaped female member 48. The head of female member 48 rides within C-shaped channel member 50 that is secured to the vertical face 52 by a screw 51. Face 52 and the rear surface of C-shaped channel member 50 have serrations that are matingly complimentary to each other to provide assistance in detachably securing C-shaped channel member 50 to frame 52. If the channel member 50 becomes misaligned due to the upward pull of the female member 48 therein during usage, the channel member 50 can be relocated at an appropriate position on frame 52.

The upper guide means shown in FIGS. 2 and 3 and include a hard rubber belt 54 which has a frustro-conical shape in cross-section and which is secured by any suitable means along the inner surface of web 16 adjacent its web top 56. The belt 54 is received within the complimentarily-shaped sheaves of pulleys 58 which are disposed from the bottom of the plate 60 to rotate about a vertical axis. The plate 60 is attached to the bottom of electrical conduit 62 (FIG. 3) which longitudinally extends from the underside of the van roof 22 for the exterior lights 63 (FIG. 3). A plurality of such complimentarily-shaped sheaves of pulleys 58 are provided along the sides and back end of the van 14.

A series of rollers 64 are mounted exteriorly of web 16 from the bottom of plate 60 to rotate in a vertical axis. The rollers 64 are in alignment with the seal 54. A space is provided between the outer periphery of the rollers 64 and the exterior surface of the web 16 to allow for the passage therebetween of the vertical reinforcements 20 for opening 18.

A belt 66, similar in design to belt 54, is secured beneath the ferrous strips 28 to the inner surface 30 of web 16 adjacent to its bottom 32 and rides within the channel 68.

Figure 7:
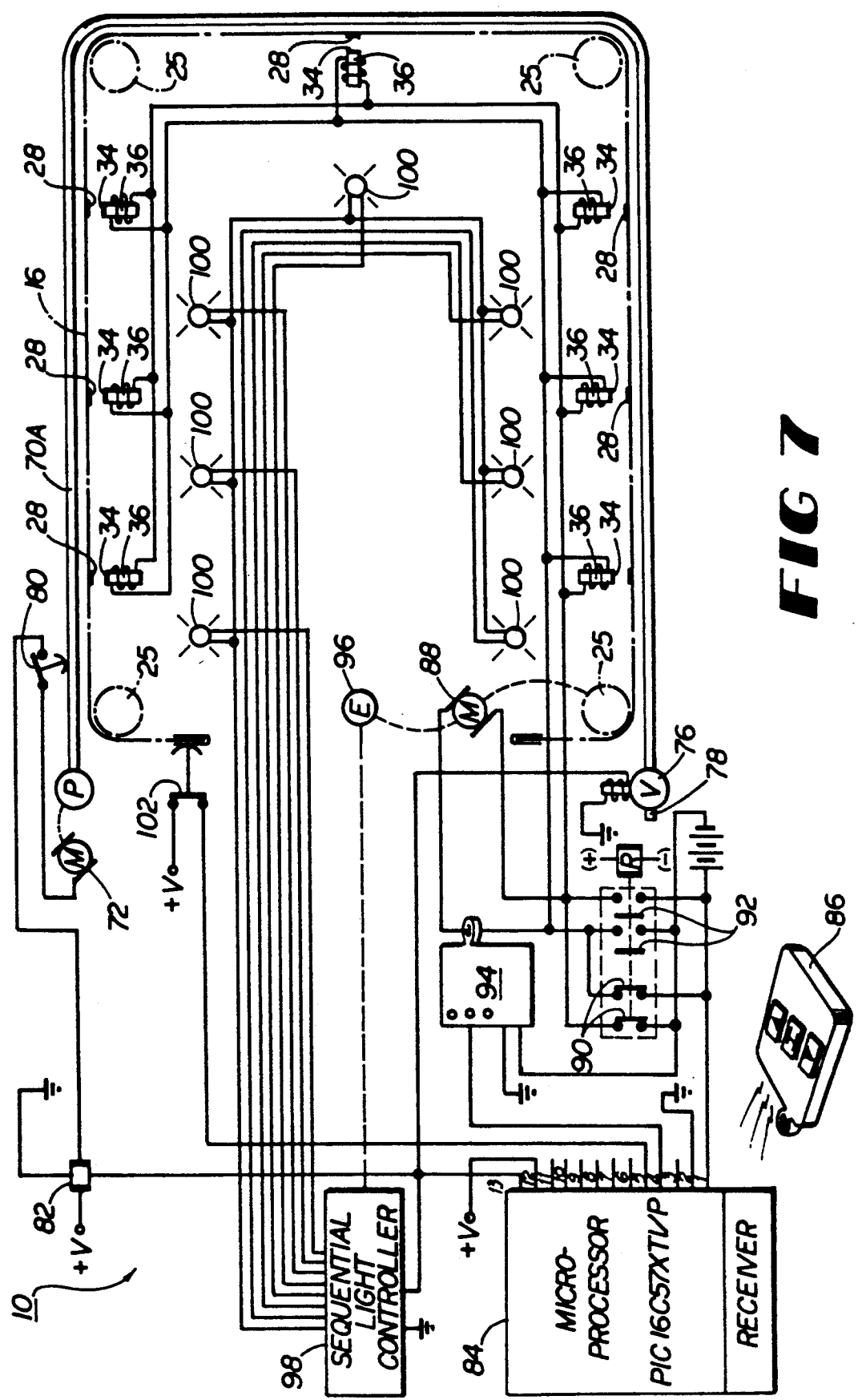
FIG. 7 is a schematic view of the mechanical and electrical components of the present invention.

The sealing means for the web 16 is shown in FIG. 3 and comprises an inflatable/deflatable bladder 70 that longitudinally extends beneath the rollers 64 adjacent the exterior surface of the web 16. A similar bladder (not shown) may be vertically disposed along the corner posts 25. A motor 72 (see FIG. 7) (manufactured by Thomas Industries, Inc., Model No. 315 CDC 50/12 F) is electrically connected to the bladder pump 74 to pump air into the bladder 70 to cause it to inflate and engage the exterior of the web 16 and assume position 70A (FIG. 3), thereby creating a seal against dust and debris from entering the interior of the van 14 over the web top 56 (FIGS. 2 and 3) as the truck 12 is traveling. Referring to FIG. 7, an electro-mechanical solenoid valve 76 is connected to the bladder 70 to close the exhaust port 78 when the bladder pump 74 is energized in order to allow the bladder to inflate. When the bladder 70 is to be deflated, just prior to the movement of the web 16 to its operative position, the electro-mechanical solenoid valve 76 is opened to allow the air within bladder 70 to be evacuated through exhaust port 78.

A pressure sensor switch 80 is connected to motor 72 to stop the motor 72 when the full inflation of the bladder 70 has occurred or to start the motor 72 if deflation occurs. Relay 82 is connected to bladder pump 74 through pressure sensor switch 80 and to microprocessor 84 to energize the bladder pump 74 for inflation or to de-energize the bladder pump 74.

FIG. 7 displays an electrical schematic of the operation of the present invention. Normally, the web 16 and its associated opening 18 are in the position as shown in FIG. 1. The operator, utilizing a hand-held, 3-button remote control transmitter 86 (manufactured by DesignTech International, Inc., 7401 Fullerton Road, Springfield, Va. 22153, part No. 20060), can push a first button to cause the web 16 to move counter-clockwise. The signal from the hand-held, 3-button remote control transmitter 86 is received by a receiver having a microprocessor 84 mounted on the truck 12 or van 14 that is connected to the curtain drive motor 88 (manufactured by Leeson Motor, 12V DC ¼ h.p. with 25:1 reduction drive) through relays 90 (for clockwise movement of the web 16 by activation of a second button on the transmitter 86 or relays 92 (for counter-clockwise movement and to apply current to the coils 36 to demagnetize permanent magnets 34 just prior to, and during, movement of the web 16). Also in-line with curtain drive motor 88 is an amperage sensor 94 (manufactured by Madison Electric Products, MESA AMS-3) which detects blockage of the opening 18 or drag on web 16 to cut-off the curtain drive motor 88.

An encoder 96 monitors curtain drive motor 88 and sends a digital signal to a sequential light controller 98 for sequentially energizing a plurality of 12 volt, D.C. lights 100 within the interior of van 14 depending upon the location of the operative position of the opening 18. Switch 102 senses when the web 16 returns to its home or inoperative position. The third button on the transmitter 86 moves the web 16 automatically back to its inoperative position.

The sequence of events occurs as follows: when either button on the hand-held, transmitter 86 is actuated to cause the web 16 to move, the permanent magnets 34 are demagnetized and the bladders 70 are deflated. The lights 100 turn on sequentially as the web 16 moves. The permanent magnets 34 and bladders 70 remain demagnetized and deflated during any movement of the web 16. The web 16 stops when it is sent to its home position, at which time the demagnetized permanent magnets 34 revert to permanent magnets, the bladders 70 reinflate and the lights 100 turn off.

What I claim is:

1. An improvement in a truck van closure of the type having a flexible closure web with an opening therethrough and means for moving the web about the perimeter of the van between an inoperative position wherein access through the opening into the interior of the van is prevented and an operative position wherein access through the opening is allowed, the improvement comprising:

means for tensioning the web in a vertical plane when the web is in its inoperative position wherein the tensioning means comprises a ferrous element secured to the interior of the web adjacent its bottom, a magnet fixed to the van and in alignment with the ferrous element when the web is in its inoperative position and means for selectively magnetizing the magnet when the web is in its inoperative position and demagnetizing the magnet when the web is moving to and in its operative position.

2. An improvement in a truck van closure of the type having a flexible closure web with an opening therethrough and means for moving the web about the perimeter of the van between an inoperative position wherein access through the opening into the interior of the van is prevented and an operative position wherein access through the opening is allowed, the improvement comprising:

means for tensioning the web in a vertical plane when the web is in its inoperative position, wherein the tensioning means comprises a C-shaped channel longitudinally extending on the van adjacent the bottom of the web, the web defining an opening therethrough in alignment with the channel, a first member that rides within the channel and a second member that extends through the opening in the web and is detachably secured to the first member.

3. An improvement in a truck van closure of the type having a flexible closure web with an opening therethrough and means for moving the web about the perimeter of the van between an inoperative position wherein access through the opening into the interior of the van is prevented and an operative position wherein access through the opening is allowed, the improvement comprising:

means for guiding the web along its path of travel between its inoperative and operative positions comprising a top belt longitudinally secured to the inner surface of the web adjacent to the top of the web, a pulley mounted in the van for rotation about a vertical axis to receive therein in sliding engagement the top belt and a roller mounted exteriorly of the web adjacent its top and in alignment with the top belt.

4. An improvement in a truck van closure of the type having a flexible closure web with an opening therethrough and means for moving the web about the perimeter of the van between an inoperative position wherein access through the opening into the interior of the van is prevented and an operative position wherein access through the opening is allowed, the improvement comprising:

means for sealing the web against foreign materials entering the interior of the van over the top of the web when the web is in its inoperative position, comprising an inflatable/deflatable bladder, means for mounting the bladder adjacent the top of the web and exterior thereof, and means for selectively inflating the bladder when the web is in its inoperative position and deflating the bladder just prior to, and during, the movement of the web to its operative position.

* * * * *